United States Patent [19]

Mensik

[11] 4,415,066

[45] Nov. 15, 1983

[54] MANHOLE SERVICE VEHICLE

[76] Inventor: Alphonse J. Mensik, 7933 127th Pl. NE., Kirkland, Wash. 98033

[21] Appl. No.: 156,805

[22] Filed: Jun. 5, 1980

[51] Int. Cl.³ .............................................. B66B 9/20
[52] U.S. Cl. ..................................... 187/9 R; 135/87
[58] Field of Search ......................... 187/9 R, 1 R, 62; 296/24 R, 1 R, 25, 37.14, 37.8, 196, 203, 204; 280/400, 415, 482; 52/DIG. 3, 169.12, DIG. 12, DIG. 14, 143, 79.1, 79.5; 298/18, 27–33; 27/32–33; 105/426, 427; 414/460, 461, 508, 542, 543, 387, 388, 491; 49/17, 33; 135/1 R, 4 R, DIG. 7

[56] References Cited

U.S. PATENT DOCUMENTS

| | | | |
|---|---|---|---|
| 276,017 | 4/1883 | Foster | 296/24 R |
| 732,348 | 6/1903 | Harrison | 296/24 R |
| 821,053 | 5/1906 | McNott | 296/24 R |
| 1,200,008 | 10/1916 | Myers et al. | 296/24 R |
| 1,475,483 | 11/1923 | Galuska | 296/24 R |
| 1,525,074 | 2/1925 | Helntz | 296/196 |
| 1,603,570 | 10/1926 | Wing | 296/24 R |
| 1,973,030 | 9/1934 | Webber | 414/461 |
| 2,473,076 | 6/1949 | Scheibner | 135/1 R |
| 3,149,739 | 9/1964 | Brown, Jr. | 414/460 |
| 3,734,540 | 5/1973 | Thiermann | 280/482 |
| 3,785,675 | 1/1974 | Norris et al. | 52/DIG. 3 |
| 3,938,861 | 2/1976 | Bagnell | 298/27 |
| 3,971,395 | 7/1976 | Lipinski | 135/1 R |
| 4,016,951 | 4/1977 | Dick et al. | 52/143 |
| 4,122,962 | 10/1978 | Goodwin, Sr. | 414/460 |

FOREIGN PATENT DOCUMENTS

| | | | |
|---|---|---|---|
| 242500 | 1/1912 | Fed. Rep. of Germany | 298/30 |
| 272809 | 9/1928 | Italy | 298/31 |

*Primary Examiner*—Joseph J. Rolla
*Assistant Examiner*—Kenneth Noland
*Attorney, Agent, or Firm*—Gregory W. Moravan; Don R. Mollick; David H. Deits

[57] ABSTRACT

An improved manhole service vehicle having an enclosed working space and an opening in its floor sized at least as large as a work man to permit him to service a manhole while the service vehicle shelters both the workman and the manhole. A laterally movable platform having a work opening is located over the floor opening to permit the final alignment of the work opening with the manhole after a metal detector located in a lid placed in the work opening permits the initial positioning of the service vehicle and the work opening over the manhole. A safety liner extending from the work opening into the manhole and a breakaway frame surrounding the floor opening help to ensure the safety of the workman should the service vehicle be hit by another vehicle. A side mounted hoist support within the vehicle permits placement of the safety liner into and out of the floor opening. Leveling jacks operable from within the service vehicle ensure the stability of the service vehicle once in position. A roof opening located over the floor opening permits the entry of large objects into the service vehicle and floor opening from the outside. A side opening and a ceiling mounted, extendable I-beam carrying a trolley mounted hoist permit the movement of heavy objects into the service vehicle and into the floor opening.

22 Claims, 7 Drawing Figures

MANHOLE SERVICE VEHICLE

BACKGROUND OF THE INVENTION

The present invention relates to service vehicles, and more particularly to an improved manhole service vehicle having an enclosed work space and an opening in its bottom wall sized at least large enough for a workman to pass therethrough while the service vehicle protects both the workman and the manhole from the environment and from traffic at the work site.

SUMMARY OF THE INVENTION

In the materials which follow, the term manhole is used in a broad sense to include any underground facility accessible through an opening in the surface of the ground; such as, by way of non-limiting example, underground facilities for pipes, wiring and equipment, and for sewers, water, power, heat and communications, and the various equipment associated therewith. The terms manhole service vehicle or servicing a manhole are also used in a broad sense to include not only the servicing of the manhole (as for repair, cleaning and maintenance), but to also include the installation and removal of various equipment in the manhole, and even the construction of the manhole itself or additions thereto. Further, the term manhole service vehicle, when referring to the present invention, includes not only a trailer type vehicle, but also includes a self-propelled vehicle.

As is known, underground utilities and the like are located underground and are serviced through manhole covers or accesses usually located in streets or other paved areas. Servicing manholes which are so located present many difficulties to a workman since the workman and the manhole cover or access are exposed to the weather during servicing, and since the workman is exposed to a safety hazard from the traffic in the street while performing his duties.

To protect the workman from the hazards presented by traffic, it is known to erect temporary barricades around the manhole cover or access to divert the traffic around the manhole, but such a procedure is time consuming and thus costly, and does not adequately protect the workman since most temporary barricades are too flimsy to stop a vehicle which may inadvertently run into them, such as at night or during inclement weather when visibilitly is poor.

For shelter from the weather, portable fabric tents or shelters are frequently used, but the use of such presents many drawbacks. For example, such fabric shelters can be costly to use since they are likely to need frequent replacement due to their fabric being susceptible to being torn during assembly, disassembly, and use; and being susceptible to deterioration from exposure to the sun and the elements. If the fabric shelter is packed up while wet, it may rot or mildew leading to its early failure. Further, since they can be time consuming to erect and take down, their use can also be costly due to the high cost of labor. In addition, they are inconvenient to use by the workmen since they are often small, poorly ventilated, lack storage space for tools, equipment or parts, and do not readily lend themselves to being heated during cold weather. Finally, such fabric shelters may frequently have to be removed and then replaced each time the entry or removal of large equipment through the manhole cover or access is required.

As a result, even when such a fabric tent or shelter is used to protect a manhole while it is being serviced, it is often necessary to also have a utility vehicle standing by which is equipped with the needed heat, tools, parts, electrical generator, dewatering pump, air blower, and the like. Thus, in conventional practice, the servicing of underground utilities through manhole accesses or covers can be quite costly and inconvenient since the use of barricades, a fabric tent or shelter, and a utility vehicle are often simultaneously required.

Accordingly, the primary objects of the present invention are to provide a manhole service vehicle which has none of these drawbacks, which solves at least all of these problems, and which is safe, durable, adapted to serve multiple purposes, and is convenient to use.

One of the problems solved by the present invention is to protect both the workman and the manhole from the weather during servicing of the manhole without the need for the erection of temporary fabric shelters. This problem is solved by providing a manhole service vehicle having an enclosed, interior working space and a bottom wall opening in the bottom wall of the service vehicle sized at least as large as a workman or any equipment needed to be placed in or removed from the manhole. The service vehicle is driven over the manhole so the bottom wall opening in the service vehicle and the manhole are aligned, at which time the service vehicle is parked in place, and levelled with interiorally operable leveling jacks. The manhole cover is removed and access is had to the interior of the manhole from the interior of the service vehicle through the bottom wall opening in the service vehicle. Thus, the vehicle protects the workman within it from the weather and also shelters the manhole since the vehicle is adapted to be parked over the manhole. Retractable skirts extending between the vehicle and the ground provide further protection from the weather.

In order to provide for the proper positioning of the vehicle over the manhole, a manhole detector (such as a metal detector) is located in the center of the closure provided for the bottom wall opening in the vehicle. When the detector is driven over the manhole it signals the driver, alerting him that the positioning of the vehicle so its bottom wall opening is over the manhole has been achieved.

A further object of the present invention is to provide for the safety of the workman using the service vehicle at the job site. First, warning lights are located on the exterior of the service vehicle itself so traffic approaching it from any direction will be alerted to the presence of the service vehicle so they may avoid it. Second, provision is made to enhance the safety of a workman who may be located between the service vehicle and the manhole access, as when he is entering the manhole from the service vehicle or vice versa. When the workman is in such a position, it is evident that he could be severely injured should the service vehicle be struck by another vehicle despite the warning lights on the service vehicle. To protect a workman in such a position, a steel safety liner is used which is supported from a personnel platform within the service vehicle which covers the bottom wall opening in the vehicle. The safety liner extends through a hole in the platform, through the bottom wall opening and into the manhole. Movement of the safety liner between its storage position within the service vehicle and the personnel platform is accomplished through use of a side mounted support for a hoist; the support having a vertical post rotatable about a vertical axis and a horizontal telescoping arm to which the hoist is mounted.

The personnel platform is laterally movable to provide for the accurate alignment of the hole in the platform with the manhole opening so the safety liner can be properly positioned in place. This lateral movability of the safety liner also protects the workman by providing a predetermined amount of relative motion between the service vehicle and the safety liner in the event of another vehicle colliding with the service vehicle. Further protection is achieved by providing a breakaway frame surrounding the bottom wall opening in the vehicle, which breaks away when contacted hard enough by the safety liner during a collision, so more relative movement between the service vehicle and the safety liner is accommodated before the safety liner is contacted by the lower main frame of the service vehicle. Naturally, the ground engaging levelling jacks will also tend to prevent or retard movement of the service vehicle should it be struck by another vehicle, thereby further enhancing its safety.

A further object of the present invention is to provide for the easy movement of the workman between the service vehicle and the manhole. To this end, the safety liner is provided with stair rungs. In addition, a ceiling mounted retractable ladder is provided which can be extended through the bottom wall opening into the manhole when needed and retracted adjacent the ceiling when not needed. In order to ensure adequate head room within the vehicle, the top wall of the vehicle is raised in the area over the bottom wall opening to provide a recess in which the ladder is stored when retracted.

A further object of the present invention is to provide the service vehicle with ample access for personnel and equipment. To this end, the service vehicle is provided with front, rear, side and/or top openings. In addition, should it be desired that large equipment be moved into the manhole, the bottom wall opening can be sized to accommodate it, the only limitation being the size of the service vehicle itself. The service vehicle is designed so large or heavy equipment can be lowered through the top opening down into the bottom wall opening and into the manhole. Naturally, the side, front and rear openings can be sized to permit the lateral entry of such equipment into the service vehicle for subsequent movement into the manhole through the bottom wall opening.

Another object of the present invention is to provide apparatus for movement of large or heavy equipment into the vehicle and then between the vehicle and the manhole. To this end, a plurality of ceiling mounted I-beam supports are provided which support an I-beam by its upper flanges for longitudinal movement of the I-beam with respect to the supports. The I-beam is arranged to be extendable through the service vehicle's front and rear doors or the vehicle's side doors. Once extended outside the vehicle, the free end of the I-beam is supported by collapsible A-frame support which can be collapsed and stored within the vehicle when not in use. A trolley running on the lower flange of the I-beam carries a hoist used to raise and lower the load.

In addition, a personnel/equipment elevator may be provided which is suspended from the sevice vehicle's upper frame, and which is guided into the manhole by guides extending from the bottom wall of the vehicle into the manhole.

In order to provide for the convenient handling of the large reels upon which cable or wire is sold, reel support horses may be mounted on opposite sides of the bottom wall opening. As the reel is placed on the horses its axle may be located in axle recesses located on the tops of the horses and secured in place with clamps.

A further object of the present invention is to make the service vehicle as self contained as possible, to thereby eliminate the need for other vehicles or separate apparatus at the job site. To this end, the service vehicle is provided with all normally needed equipment, tools and parts which are stored in the storage location provided by the vehicle. In addition, the vehicle is provided with its own electric generator, water pump for dewatering the manhole as necessary, an air blower for ventilating the manhole, a heater, an air conditioner, a gas detector for sensing dangerous gases in the manhole, and emergency battery power should the generator fail.

These and further objects, features, advantages and characteristics of the manhole service vehicle of the present invention will be apparent from the following more detailed description of the preferred embodiments thereof; it being understood that the foregoing was only a brief summary of the present invention, and was not intended to be a detailed catalog thereof.

DESCRIPTION OF THE PREFERRED EMBODIMENTS

Figure 1:
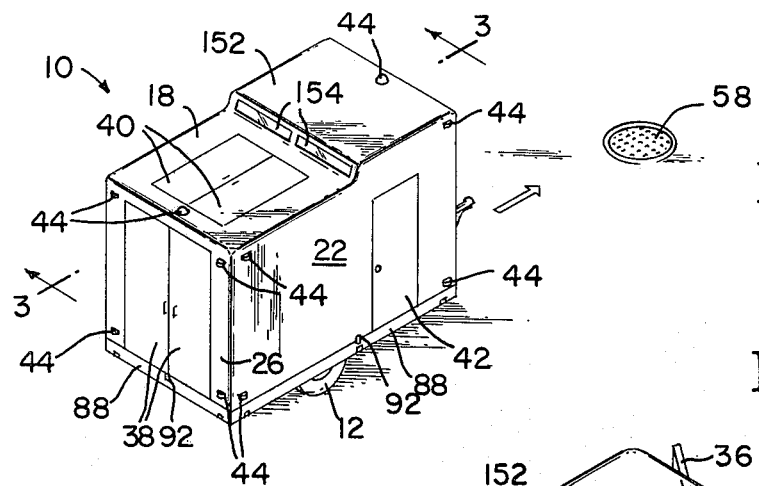
FIG. 1 is a small scale perspective view of the service vehicle of the present invention.

Turning now to the figures, the manhole service vehicle of the present invention, generally designated at 10, is of conventional construction (except for the many features described in detail below), and has a frame, wheels 12 mounted on the frame for easy movement of the vehicle, trailer tongue 14 with hitch 16, an top 18, bottom 20, side 22, front 24, and rear 26 walls mounted to the frame to provide an enclosed working space within the vehicle 10.

It should be understood that although the manhole service vehicle 10 is illustrated in the figures as being in the form of a trailer, it is within the scope of the present invention that the service vehicle be self propelled. Accordingly, the term service vehicle is used herein in its broad sense of including not only a trailer but also a self propelled vehicle.

The vehicle 10 is provided with front, rear, top and side openings 28-34, respectively, fitted with doors 36-42, respectively of conventional construction. It is understood that the openings 28-34 and their doors 36-42 are sized to permit easy entrance of the workman and the largest size equipment the vehicle 10 is adapted to receive. Their exact number and location could vary from those illustrated, according to the needs of the user. For safety purposes, the exterior of the vehicle is provided with conventional electric warning lights 44 on all four sides and on its top at the front and rear.

Figure 3:
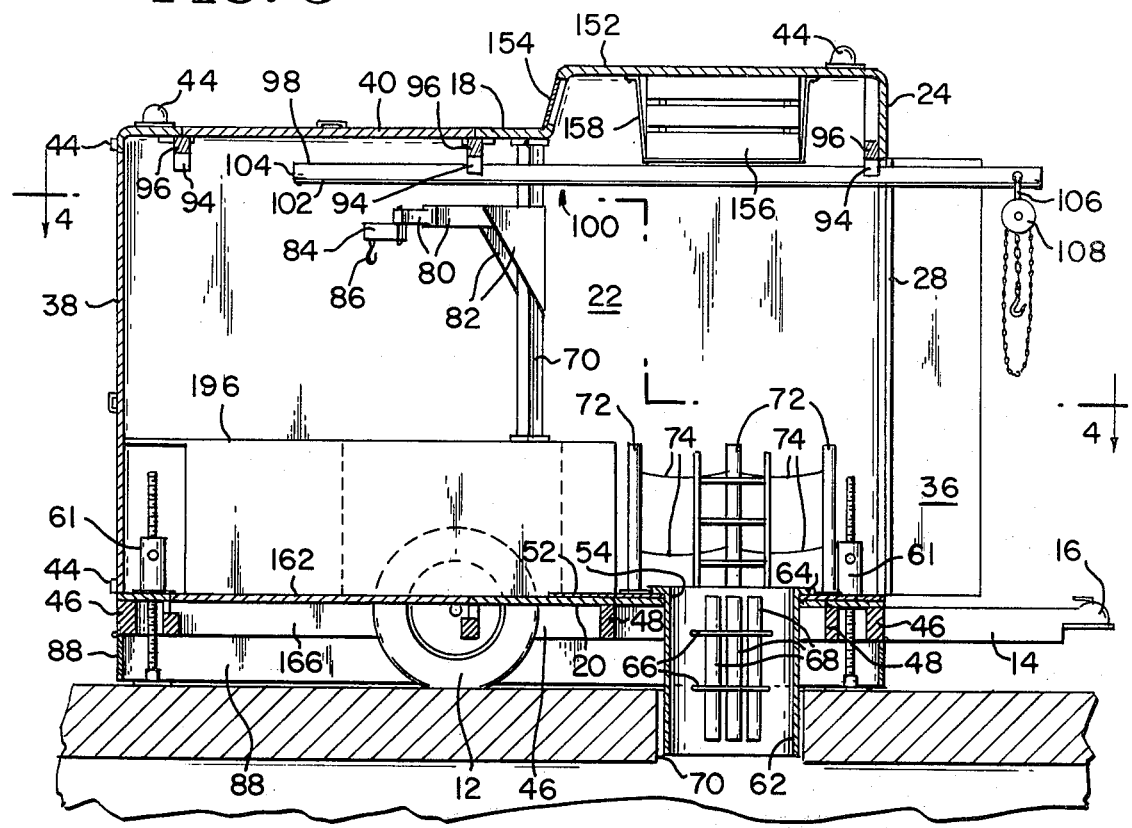
FIG. 3 is a longitudinal cross section schematical view of the service vehicle shown in position at a job site over a manhole.
Figure 4:
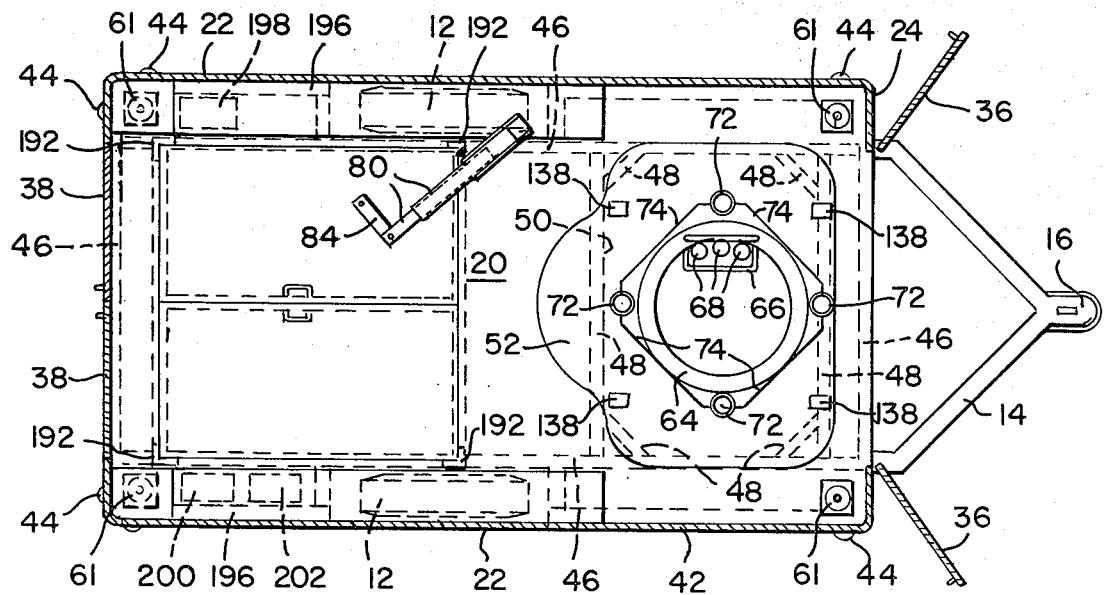
FIG. 4 is a cross sectional schematical view of the service vehicle shown in FIG. 3, taken along line 4—4 thereof.

Turning now to FIGS. 3 and 4, it is seen that the vehicle's frame includes a lower main frame 46 under the periphery of the bottom wall 20 of the vehicle 10. Secured to the lower main frame 46 is a breakaway frame 48 which surrounds the bottom wall opening 50 and supports the bottom wall 20 adjacent the opening 50. The breakaway frame 48 is of lesser strength than the main frame, such as being constructed of wood, and is assembled and is secured to the main frame with any suitable breakaway fasteners, such as metal straps designed to give way when a predetermined amount of stress is inflicted upon them. A further purpose of the breakaway frame 48 will be discussed below.

Figure 2:
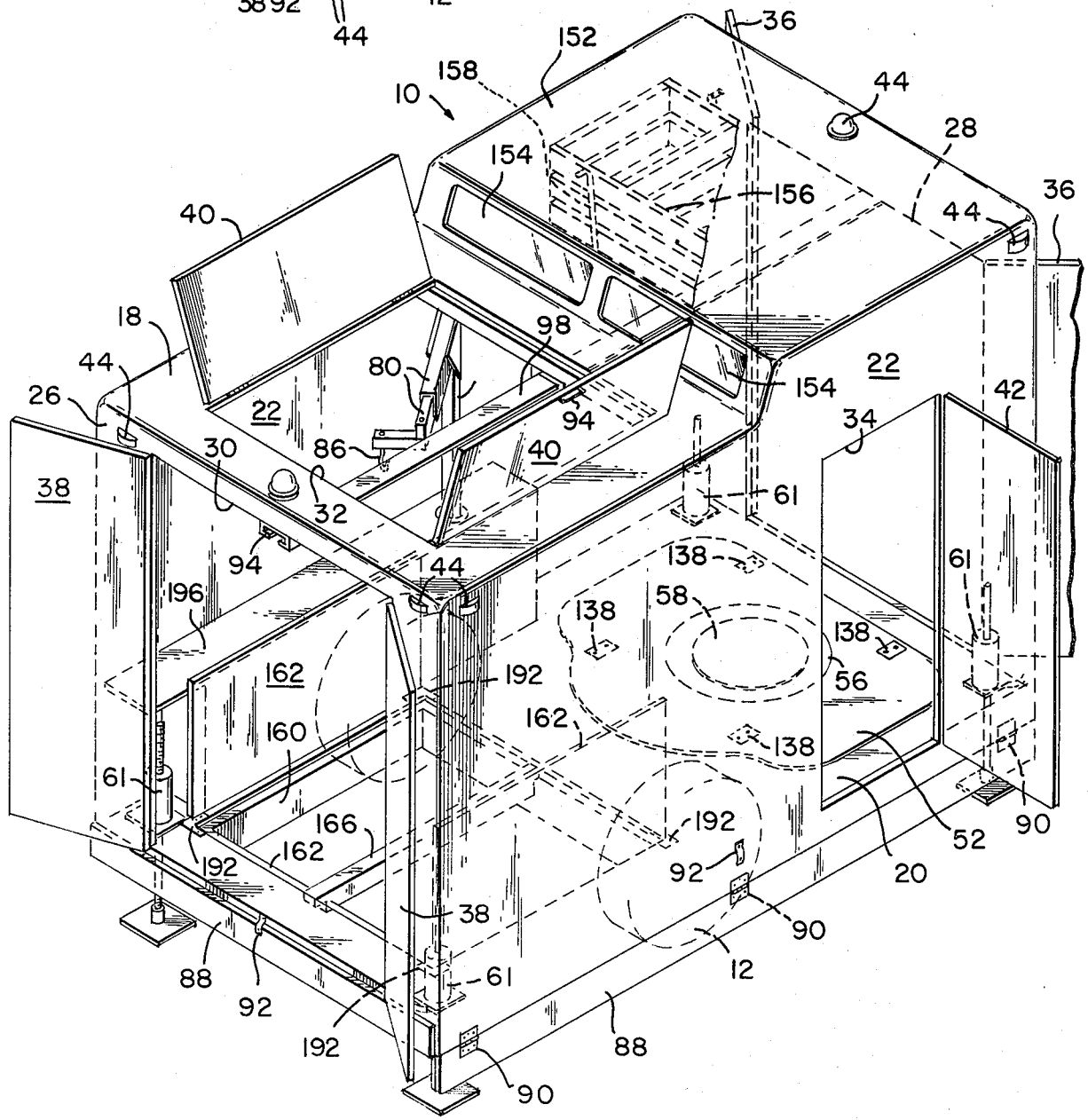
FIG. 2 is a large scale, schematical perspective view of the service vehicle showing some of its internal parts in phantom.

Lying on the bottom wall 20 and covering the bottom wall opening 50 is a personnel platform 52, preferably made of steel for strength, having a personnel opening 54 therein. As seen in FIG. 2, when the vehicle is being driven to the work site, and when the bottom wall opening 50 is not in use, a lid 56 fits into and covers the opening 50, for safety purposes. The lid 56 carries a manhole cover detector 58 for detecting the manhole cover 60 see in FIG. 1. The detector 50 may sense manhole cover 60 by any conventional means, such as acoustically, optically, magnetically or by other means. For example, a metal proximity detector model M-90 manufactured by the Fisher Company of Belmont, Calif. will give satisfactory results. The detector 48 is then conventionally wired to give a visual or an oral indication to the driver of the vehicle when it senses that it is over the manhole cover 60. When the detector 58 is over the manhole cover 60 it will, as has been mentioned, alert the driver so he knows the vehicle is properly positioned so its bottom wall opening 50 is aligned with the manhole cover 60. Once the vehicle 10 is in position the levelling jacks 61, which are of conventional design, are utilized to stabilize the vehicle. For the workman's convenience and protection from the weather, it is preferred that the jacks 61 be operable from within the vehicle 10 rather than from outside thereof. Then, the lid 56, including the detector 58, are removed to expose the personnel opening 54 in the platform 52. If it is desired to pass objects sized larger than a workman (and larger than the personnel opening 54) through the bottom wall opening 50, the platform 52 can be removed to expose the entire opening 50.

However, to prepare the personnel opening 54 for use by a workman after the lid 56 has been removed, a safety liner 62 is placed through the opening 54 and is held in place by its lip 64 which engages the platform 52. The safety liner is made from tough, high strength steel, for purposes explained in detail below; and includes stair rung 66 and utility conduits 68. Electric cords, dewatering pipes, air blower pipes, etc. (not illustrated) may be passed through the conduits 68 to prevent their interfering with a workman passing through the safety liner 62. As seen in FIG. 3, the safety liner extends a substantial distance (at least six inches) into the manhole 70. For safety, a safety barricade including posts 72 and ropes 74 are mounted to the platfrom 52 by any conventional means around the platform opening 54 after the safety liner 62 is in place. When not in use, the safety liner 62, lid 56, platform 52, posts 72 and ropes 74 are stored in predetermined storage locations (not illustrated) provided by the vehicle 10.

Since, as seen in FIG. 3, the safety liner 62 extends substantially straight down into the manhole 70, it will be appreciated that if the platform 52 from which the safety liner is suspended were fixed in place, it would be quite difficult to achieve the nearly exact alignment of the opening 54 in the platform with the manhole 70 which is necessary for the correct placement of the safety liner; even with the assistance of the detector 58. Accordingly, the platform 52 is not permanently fixed to the bottom wall 20 of the service vehicle, but instead is designed to slide on the upper surface of the bottom wall 20, so that after the service vehicle is initially positioned over the manhole 70 by the use of the detector 58 the final alignment of the opening 54 in the platform 52 with the manhole 70 is achieved by moving the platform 52 laterally on the bottom wall 20 as needed.

As best seen in FIG. 4, the platform is sized larger than the opening 50 in the bottom wall 20 so as to permit about nine inches of motion in any direction from its center position without exposing, beyond its periphery, the bottom wall opening 50; which exposure might present a safety hazard to a workman. Although stops mounted to the bottom wall 20 may be used to prevent motion of the platform past about nine inches, in the vehicle 10 shown in FIG. 4, the platform 52 is sized and shaped so the interior of the vehicle is used as a stop for the platform, thereby eliminating the need for separate bottom wall mounted stops which might present a tripping hazard for a workman.

The safety liner 62, or other heavy objects, can be moved within the vehicle 10 and moved between the bottom wall opening 50 and the manhole 70 by use of a side mounted swing hoist support having a vertical post 78 mounted for rotation about a vertical axis on any conventional bearings (not illustrated). Affixed to the post 78 is a horizontal telescoping arm 80 of any conventional construction which is additionally supported by a pair of braces 82. At the end of the telescoping arm 80 is a swing arm 84 mounted for rotation about a vertical axis with respect thereto. A hook 86 is provided on the end of the swing arm 84 and is adapted to support a hoist of any conventional construction (not illustrated) by which a heavy object such as the safety liner 62 can be raised and lowered. Said side mounted swing hoist support is sized and located so as to conveniently reach over all the interior working space of the vehicle 10.

As is known, a great many manholes have their access lids 58 located in areas of heavy traffic, such as roads or parking lots. As the result, the service vehicle 10, no service vehicle 10, no matter how well marked, or how prominent its warning lights may be, is faced with the possibility of being hit by another vehicle while on the job site; particularly at night, during fogs, or during stormy weather when visibility and road traction may be poor.

Such a collision by another vehicle with the service vehicle 10 while the service vehicle is parked at a job site over a manhole 70 presents, for obvious reasons, a particularly dangerous situation to a workman who may be situated between the bottom wall opening 54 and the manhole 70. Naturally, the safety liner 62 itself provides a first line of defense from injury to a workman who may be so situated. A second line of defense is provided by the fact that the platform 52 (which supports the safety liner 62) is movable with respect to the vehicle 10 so that in a minor collision in which the service vehicle is not moved very far by the force of the impact, the platform 52 will accommodate some degree of relative motion between it and the service vehicle without large forces being applied to the safety liner.

In more violent collisions, a third line of defense is provided by the breakaway frame 48 surrounding the bottom wall opening 54. In such a violent collision, the service vehicle may be propelled by the impact a distance such that the movability of the platform 52 will not accommodate it all, resulting in the breakaway frame striking the safety liner 62. However, since the breakaway frame is designed to collapse and/or break away from the lower main frame of the vehicle after it imposes a predetermined amount of stress on the safety liner, the chances of injury to the workman is reduced in two ways. First, a significant portion of the energy from the collision will be absorbed by the breakaway frame as it is collapsing and breaking away. Second, it will be appreciated that by virtue of the fact that the breakaway frame 48 does break away, a greater amount of relative motion between the service vehicle 10 and the safety liner 62 will be accommodated before the lower main frame 48 of the service vehicle will strike the safety liner. Although the breakway frame 48 is not illustrated as extending to the sides of the bottom wall opening 50, as seen in FIG. 4, it is apparent that the breakaway frame could be so extended in a manner apparent to one skilled in the art in view of the disclosures herein.

It should also be noted that a significant amount of the force of the collision would be absorbed by the service vehicle itself during the collision; and by the interior structure of the service vehicle as it is deformed and penetrated by the steel platform 52 when the platform 52 is forced into the interior structure of the service vehicle as the relative motion between the platform 52 and the service vehicle 10 exceeds the normal design limits of travel of the platform 52.

A fourth line of defense is provided in all collisions, of whatever severity, by the ground engaging levelling jacks 61 which will naturally tend to significantly prevent or reduce any movement of the service vehicle during a collision.

Turning now to other matters, it is apparent that the interior working space of the service vehicle will shelter the workman from the weather, while the service vehicle protects the workman and the manhole 70 from the weather by virtue of the fact that the service vehicle is designed to be parked over, and thus shelter the same. To guard against the entry of the elements underneath the service vehicle, it is provided with a skirt 88 on all four sides. Preferably, the skirt is secured to the outside of the vehicle with hinges 90. When not in use, the hinges 90 permit each skirt to be selectively folded up adjacent the exterior of the service vehicle and held in place with a retaining strap 92 of any conventional design. As needed, each restraining strap is unfastened permitting its skirt to hang down and shelter the space beneath the service vehicle. Naturally, each skirt 88 is sized to extend from the vehicle to the ground, and when all the skirts are lowered a complete enclosure about the base of the service vehicle is provided. Although not illustrated, additional removable restraining straps 92 could be provided to secure the adjacent corners of the lowered skirts 88 together to prevent the skirts from being moved out of position by the wind.

Turning now to FIGS. 3 and 4, it is seen that the service vehicle is provided with a plurality of I-beam supports 94 which are secured by any conventional kmeans to the top main frame 96 of the service vehicle 10. The I-beam supports are shaped so as to be adapted to engage top flanges 98 of the I-beam, generally designated at 100. The I-beam is preferably made of steel or some other strong material and has upper and lower flanges 98, 102 interconnected by a web 104. The supports 94 are sized so as to permit the easy sliding of the I-beam 100 in them. A trolley 106, which supports a hoist 108 of conventional design, is suspended from and travels along the I-beam's lower flange 102. The I-beam is designed to be extended through either the front or rear openings 28, 30 of the service vehicle, and is shown extended through the front opening 28 in FIG. 3. The I-beam's length is preferably chosen so it will fit within the service vehicle for storage while suspended from the supports 94 when the front and rear door 36, 38 are closed.

Similarly, although not illustrated, an I-beam extending transversely with respect to the service vehicle could be supported on similar supports and arranged to extend through side openings in the service vehicle 10.

Figure 5:
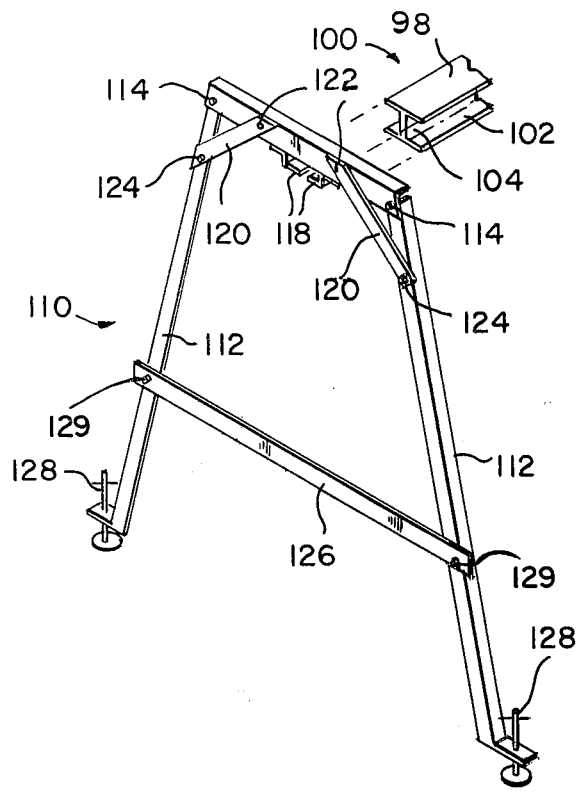
FIG. 5 is a perspective view of the collapsible, A-frame adapted support for the service vehicle's I-beam.

When one end of the I-beam 100 is extended through one of the service vehicle's openings, such as the front opening 28 as shown in FIG. 3, and a heavy load is to be carried by the hoist 108 on the I-beam, use of the collapsible A-frame support, designated at 110 in FIG. 5, to support the free end of the I-beam may be necessary. The A-frame support comprises a pair of legs 112 movably secured, as with pins 114 to a top cross member 116. An I-beam support 118 is secured to the member 116 by any conventional means and is adapted to engage and support the top flange 98 of the I-beam. A pair of top braces 120 have their upper ends pivotally secured with pins 122 to the member 116 while their lower ends have notches engageable with pins 124 on the legs 112. A lower brace 126 extends between the legs 112, and has notches in its ends engageable with pins 129 on the legs 112. Threadably adjustable feet 128 on the legs 112 permit the levelling and height adjustment of the A-frame support 110 which may be needed on uneven terrain or on hills.

When not needed, the A-frame support is collapsed for storage in the service vehicle 10 by first disengaging the lower brace 126 from the pins 129. This permits the inward rotation of the legs 112 about pins 114 until the notches on the top braces 120 disengage from the pins 124; at which time the braces 120 can then be rotated on the pins 122 until clear of the legs 112. Then, the A-frame support 110 can be totally collapsed by rotating the legs 112 together about pins 114 until their lower ends touch; or by rotating the top member 116 about one of the pins 114 until it touches one of the legs 112 and the legs 112 are adjacent each other. The manner of the reassembly of the A-frame support 110 should be clear from the foregoing. Use of the I-beam 100 and the trolley mounted hoist 108 to lift heavy loads located outside the vehicle 10, to transport them within the vehicle, and to lower them through the bottom wall opening 54 into the manhole 70 (as well as the reverse process) should be apparent in view of the foregoing disclosures. Naturally, the I-beam 100 and trolley mounted support 108 can be used to lift the safety liner 62 from its storage location in the service vehicle and place it in the bottom wall opening 54, as well as for the reverse process.

Figure 6:
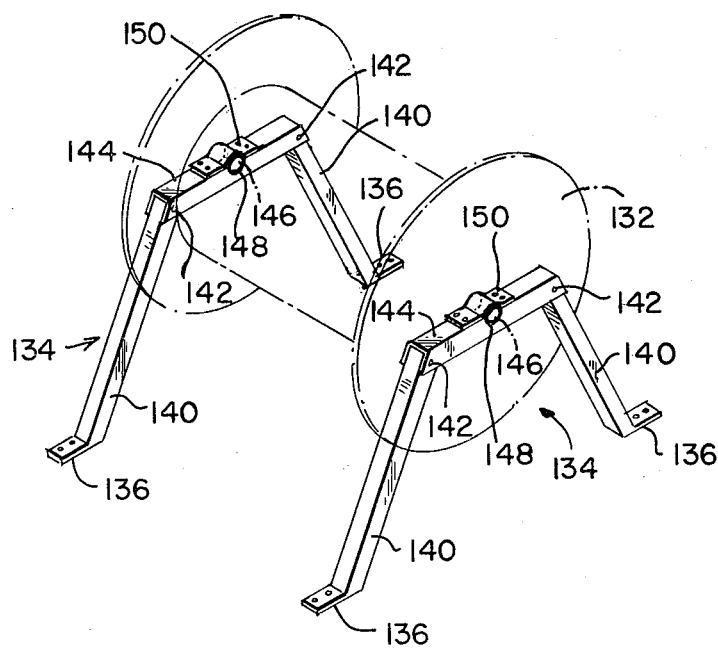
FIG. 6 is a perspective view of the reel support horses adapted to be mountable in the service vehicle.

As is known, electrical wire, cable, flexible pipe, etc. (not illustrated) is frequently stored on large reels 132, such as the one shown in phantom in FIG. 6. Accordingly, the service vehicle 10 is provided with a pair of collapsible reel horses, generally designated at 134, whose feet 136 are adapted to be secured by any conventional means to pads 138 provided on the personnel platform 52. Each horse 134 comprises a pair of legs 140 having their upper ends pivotally secured with pins 142 to a top cross member 144. The outer edge of the top of each leg 140 is notched to interlock with its corresponding end of the top member 144 when the leg 140 is fully extended.

After the horses are secured to the top platform 52, the I-beam 100 and the trolley mounted hoist 108 are used to lift the reel 132, transport it into the service vehicle and place it so its axle 146 (or an axle which may be provided for the purpose) rests in the arcuate recesses 148 in the top members 114 of the horses. After the axle is in place, it can be retained therein with retainers 150 which are then secured to the top members 144 by any conventional means. The cable, etc. on the reel 132 can then be fed into the manhole 70 as needed, as through one of the conduits 68 provided in the safety liner 62. When finished with the reel 132, the manner of its release and its removal from the service vehicle 10 will be apparent from the foregoing. To collapse its reel horse after its use is no longer needed, its feet 136 are first disengaged from the pads 138 and its top brace 144 and one leg 140 are rotated until the top brace and the leg are folded adjacent it other leg 140. Then the collapsed horses 134 can be conveiently stored in storage locations provided by the service vehicle 10.

Referring now to FIGS. 2 and 3, it is seen that the forward portion 152 of the top wall 18 is raised as compared with the rest of the top wall 18. The portion 152 is equipped with skylights 154 and, due to its raised nature, provides a recess within which a collapsible ladder 156 can be stored while still providing the minimum required headroom in the service vehicle. The ladder 156 has one end pivotally connected to the side portion 152 of the top wall. As seen, the ladder has three sections, although fewer or more sections may be used, each of which is hingedly connected to its neighbor section in the conventional fashion so that the ladder can be unfolded and extended as desired down through the bottom wall opening 50 in the service vehicle and into the manhole 70 (when the safety liner 62 is not used) and folded and retracted against the ceiling when it is not needed and then held in place by a retainer 158 releasably secured to the ceiling by any conventional means. Naturally, when the ladder is extended, the I-beam 100 must first be slid in its supports 94 out of the way. Preferably, the ladder is sized and located so that once it is extended down through the bottom wall opening 50, the I-beam may be repositioned over the bottom wall opening 50 for its subsequent use.

As best seen in FIG. 2, the service vehicle is also provided with a large equipment opening 160 in the bottom wall 20 to accommodate large pieces of equipment. The opening 160 is provided with a pair of removable doors 162. The edges of the doors fit into a recess 164 around the top of the opening 160, while their inner portions are supported by removable strong back 166 whose notched ends are removably engageable with matching slots in the edge of the opening 160.

Naturally, when the opening 160 is desired to be used, the service vehicle is placed so the opening 160 is located over the manhole 70. Although not illustrated, the opening 160 can be provided with a detector 58 to signal the driver when the opening 160 is over the manhole cover 58. It will be appreciated that, after the I-beam 100 is slid out of the way, a crane can be used to lower bulky objects down into the manhole 70 through the vehicle's top opening 32 and equipment opening 160 since they are aligned. In addition, the trolley mounted hoist 108 on the I-beam 100 as well as the side mounted swing hoist having vertical post 78 can be used to raise and lower heavy objects through the equipment opening 160.

Figure 7:
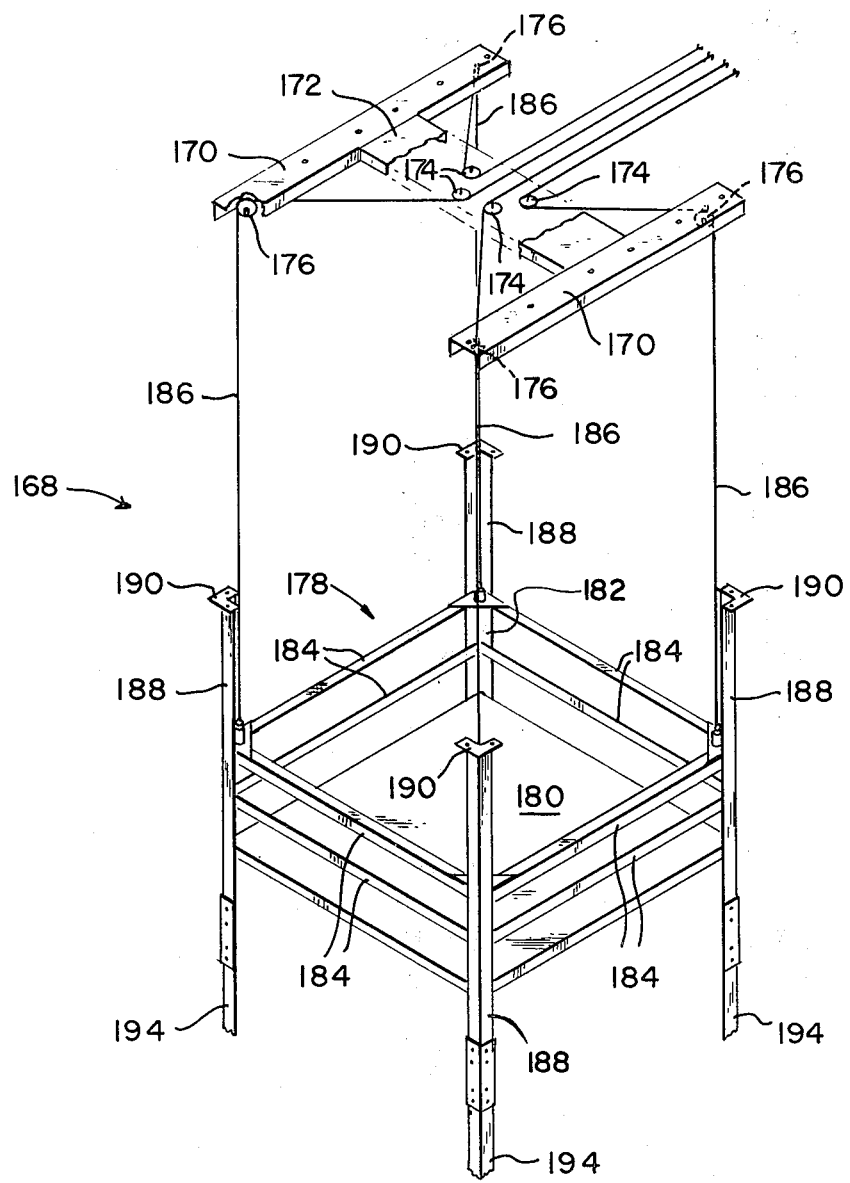
FIG. 7 is a schematical perspective view of a personnel/equipment elevator adapted to be used with the service vehicle.

Turning now to FIG. 7, there is illustrated an elevator, generally designated at 168, which is adapted to be used with service vehicle 10. In FIG. 7, the side pieces 170 are adapted to be secured by any conventional means to the side longitudinal top main frame members (not illustrated) of the service vehicle 10. Then a cross piece 172 is similarly adapted to be secured to the side pieces 170. Alternatively, the side pieces 170 could be eliminated and the cross piece 172 could be secured directly to the side longitudinal top main frame members of the service vehicle 10. The cross piece 172 and the right side piece 170 are shown in phantom in FIG. 7 to permit the other structures of the elevator to be more clearly seen.

Secured to the lower surface of the cross piece 172 are four fair lead pulleys 174; while secured to the side pieces 170 are four support pulleys 176. An elevator cage, generally designated at 178, comprises a floor 180, four angle metal corner members 182, and a plurality of side rails 184. The corners of the elevator cage 178 are supported by four wire ropes 186 which are reeved through the support pulleys 176 and fair lead pulleys 174; and are then connected to any conventional winch (not illustrated). However, the conventional winch is preferably equipped with a winch drum having separate compartments, defined by radial flanges on the winch drum, for each wire rope 186 to ensure the equal winding and unwinding of the wire rope on the winch to ensure the corners of the elevator cage 178 are raised and lowered equally to prevent tipping or jamming of the elevator cage.

To help ensure the proper guidance of the elevator cage down into the equipment opening, four angle metal guides 188 are used having upper feet 190 securable by any conventional means to pads 192 provided on the top of the bottom wall 20 of the service vehicle at the corners of the equipment opening 160.

If the manhole 70 beneath the equipment opening 160 is too deep for the guides 188 to reach the bottom thereof, as many guide extensions 194 may be secured thereto by any conventional means as needed.

It is noted that the elevator 168 is assembled with releaseable fasteners of any conventional design so that it can be disassembled and removed when not needed and reassembled in place when needed.

Turning now to FIGS. 2-4, it is seen that the service vehicle 10 is provided with two side storage compartments 196 within which tools, equipment, parts, etc. may be stored. Although not illustrated for reasons of clarity, as many additional compartments and/or shelving of any conventional design, as was desired could be secured within the service vehicle along its side walls 22. Naturally, additional compartments, shelving, racks, etc. could be provided on the exterior of the service vehicle for similar purposes.

To make the service vehicle 10 as self sufficient as possible, and to eliminate the need for ancillary equipment to be moved to the job site adjacent the manhole 70, it is preferred that the service vehicle be provided with an electrical generator means 198 for powering the service vehicle, manhole 70, and their associated equipment; a pump means 200 for dewatering the manhole 70; and a fresh air ventilation blower means 202 for ventilating the manhole; all of conventional construction and conventionally used and connected. It is preferred that, as seen in FIG. 4, the generator 198 and air blower 202 be located on opposite sides of the service vehicle so the air blower will not inhale the exhaust from the generator. The generator is preferably provided with a service vehicle mounted fuel tank, and externally located air intake and exhaust outlets (all not illustrated). The air blower is also preferably provided with an external air intake, not shown. Although not illustrated, the service vehicle 10 can also be provided with a heater and an air conditioner for the workman's comfort within the vehicle 10.

From the foregoing, various further applications, modifications and adaptations of the apparatus disclosed by the foregoing preferred embodiments of the present invention will be apparent to those skilled in the art to which the present invention is addressed, within the scope of the following claims.

I claim:
1. A manhole service vehicle comprising:
   a. frame means;
   b. wheels mounted on said frame means for easy movement of said vehicle;
   c. top, bottom, side and front and rear wall means mounted on said frame means to provide an enclosed, sheltered, work space within said vehicle within which a workman may work while standing at least generally upright during normal use of the vehicle for its intended purpose;
   d. a selectively openable and closeable door means in at least one of said side, front and rear wall means of said vehicle, said door means being sized and located to permit the easy entry and exit of said workman into and out of said enclosed working space within said vehicle;
   e. wherein said bottom wall means of said vehicle defines, within said workspace, a substantially flat, horizontal workfloor means within said vehicle upon which said workman can walk, during normal use of the vehicle for its intended purpose; and
   f. wherein said bottom wall means of said vehicle defines at least one bottom wall opening means wherein said bottom wall opening means is provided with a cover adapted to prevent the entry of debris of the elements into said vehicle when said bottom wall opening means is not being used, wherein said bottom wall opening means is at least partially surrounded by said workfloor means, is sized to easily permit a workman to pass therethrough, and wherein said vehicle and bottom wall opening means are positioned, during use of the manhole service vehicle, over a manhole to enable said workman to have access to said manhole from the interior of said vehicle and to have access to the interior of said vehicle from said manhole through said bottom wall opening means while said workman and said manhole are protected from the environment by said service vehicle.

2. The service vehicle according to claim 1, wherein said service vehicle includes selectively positionable skirt means of a fixed height adapted to keep the elements from said manhole when it is located beneath said service vehicle.

3. The service vehicle according to claim 2, wherein said skirt means are secured adjacent the periphery of said service vehicle, and wherein said skirt means when extended, extend between said service vehicle and the ground.

4. The service vehicle according to claim 3, wherein said skirt means comprise one skirt member means for each of the four sides of said service vehicle, wherein each said skirt member means is adapted to be hingedly connected to its respective side of said service vehicle, and to be selectively rotatable between a compact, storage position adjacent its said respective side, and an extended working position wherein it extends between its said respective side and the ground.

5. The service vehicle according to claim 1, wherein said bottom wall means defines a second bottom wall opening means sized to easily allow equipment larger than a workman to pass therethrough.

6. The service vehicle according to claim 5, wherein said service vehicle further comprises a top opening defined by said top wall means, wherein said top opening is sized substantially about at least as large as said second bottom wall opening means, is located over said second bottom wall opening means, and is adapted to permit articles to be lowered from outside said service vehicle through said top opening means, through said second bottom wall opening means, and into said manhole.

7. The service vehicle according to claim 5, wherein said service vehicle further comprises opening means defined by one of said wall means, wherein said opening means is sized at least about as wide as said second bottom wall opening means to permit articles to be moved through said opening means and into said second bottom wall opening means.

8. An improved manhole service vehicle of the type comprising:
   a. a frame means;
   b. wheels mounted on said frame means for easy movement of said vehicle; and
   c. top, bottom, side, and front and rear wall means mounted on said frame means to provide an enclosed, working space within said vehicle; wherein the improvement comprises:
   at least one bottom wall opening means defined by said bottom wall means, wherein said bottom wall opening means is sized to easily permit a workman to pass therethrough, wherein said vehicle is positioned, during use of the manhole service vehicle, over a manhole to enable said workman to have access to said manhole from the interior of said vehicle through said bottom wall opening means while said workman and said manhole are protected from the environment by said service vehicle; and wherein said service vehicle further comprises a removable safety liner means, sized to easily permit a workman to pass therethrough, having one end adapted to extend through said bottom wall opening means, and having its other end adapted to extend into said manhole to enable said safety liner to tend to prevent substantial amounts of relative motion between said service vehicle and said manhole to prevent injury to said workman who may be located in said safety liner between said bottom wall opening means and said manhole, should said service vehicle be hit by another vehicle.

9. The service vehicle according to claim 8, wherein said one end of said safety liner means is adapted to be supported by said service vehicle.

10. An improved manhole service vehicle of the type comprising:
   a. a frame means;
   b. wheels mounted on said frame means for easy movement of said vehicle; and
   c. top, bottom, side, and front and rear wall means mounted on said frame means to provide an enclosed, working space within said vehicle; wherein the improvement comprises:
   at least one bottom wall opening means defined by said bottom wall means, wherein said bottom wall opening means is sized to easily permit a workman to pass therethrough, wherein said vehicle is adapted to be positioned over a manhole to enable said workman to have access to said manhole from the interior of said vehicle through said bottom wall opening means while said workman and said manhole are protected from the environment by said service vehicle; and further comprising closure means for said bottom wall opening means, wherein said closure means includes a laterally movable platform means defining a platform hole sized to easily permit said workman to pass therethrough, wherein said laterally movable platform means is adapted to move in a plane generally parallel to the surface of said bottom wall, wherein said bottom wall opening means are sized larger than said platform hole, wherein said platform means are laterally movable with respect to said bottom wall opening means to permit the final alignment of said platform hole with said manhole after said vehicle has been positioned over said manhole, wherein said platform means is sized at least generally larger than said bottom wall opening means to permit said lateral movement of said platform means with respect to said bottom wall opening means without exposing substantial amounts of said bottom wall opening means beyond the periphery of said platform means; and wherein said vehicle further comprises stop means for restricting said lateral movement of said platform means to prevent substantial amounts of said bottom wall opening means from being exposed beyond the periphery of said platform means.

11. The service vehicle according to claim 10, wherein said stop means comprise portions of the interior of said vehicle located at various positions about said platform means, and wherein said platform means is shaped to permit a predetermined amount of said lateral movement despite the irregular positioning of said portions of the interior of said vehicle.

12. The manhole service vehicle according to claim 10 wherein said platform means overlies said bottom wall opening means.

13. An improved manhole service vehicle of the type comprising:
   a. a frame means;
   b. wheels mounted on said frame means for easy movement of said vehicle; and
   c. top, bottom, side, and front and rear wall means mounted on said frame means to provide an enclosed, working space within said vehicle; wherein the improvement comprises:
   at least one bottom wall opening means defined by said bottom wall means, wherein said bottom wall opening means is sized to easily permit a workman to pass therethrough, wherein said vehicle is adapted to be positioned over a manhole to enable said workman to have access to said manhole from the interior of said vehicle through said bottom wall opening means while said workman and said manhole are protected from the environment by said service vehicle; and wherein said service vehicle further comprises retractable ladder means carried by said top wall means at a location generally over said bottom wall opening means, wherein said ladder means are adapted to be selectively retracted adjacent said top wall means and selectively extended through said bottom wall opening means.

14. The service vehicle according to claim 13, wherein said top wall means has a portion thereof higher than the rest of said top wall means, wherein said portion defines a recess adapted to receive said ladder means in a retracted, storage position, while still providing a minimum free head clearance within the interior of said service vehicle.

15. An improved manhole service vehicle of the type comprising:
   a. a frame means;
   b. wheels mounted on said frame means for easy movement of said vehicle; and
   c. top, bottom, side, and front and rear wall means mounted on said frame means to provide an enclosed, working space within said vehicle; wherein the improvement comprises:
   at least one bottom wall opening means defined by said bottom wall means, wherein said bottom wall opening means is sized to easily permit a workman to pass therethrough, wherein said vehicle is adapted to be positioned over a manhole to enable said workman to have access to said manhole from the interior of said vehicle through said bottom wall opening means while said workman and said manhole are protected from the environment by said service vehicle; and further comprising closure means for said bottom wall opening means, wherein said closure means comprises lid means adapted to selectively permit and prevent access through said bottom wall opening means, and wherein said lid means includes detector means for signalling when said lid means are over said manhole to aid in the proper positioning of said vehicle over said manhole to ensure said bottom wall opening means and said manhole are substantially aligned.

16. An improved manhole service vehicle of the type comprising: comprising:
   a. a frame means;
   b. wheels mounted on said frame means for easy movement of said vehicle; and
   c. top, bottom side, and front and rear wall means mounted on said frame means to provide an enclosed, working space within said vehicle; wherein the improvement comprises:
   at least one bottom wall opening means defined by said bottom wall means, wherein said bottom wall opening means is sized to easily permit a workman to pass therethrough, wherein said vehicle is adapted to be positioned over a manhole to enable said workman to have access to said manhole from the interior of said vehicle through said bottom wall opening means while said workman and said manhole are protected from the environment by said service vehicle; and further comprising closure means for said bottom wall opening means, wherein said closure means includes a laterally movable platform means defining a platform hole sized to easily permit said workman to pass therethrough, wherein said bottom wall hole means are sized larger than said platform hole, wherein said platform means overlies said bottom wall opening means, wherein said platform means are laterally movable with respect to said bottom wall opening means to permit the final alignment of said platform hole with said manhole after said vehicle has been positioned over said manhole, wherein said platform means is sized larger than said bottom wall hole means to permit said lateral movement of said platform means with respect to said bottom wall hole means without exposing substantial amounts of said bottom wall hole means beyond the periphery of said platform means; and wherein said closure means further comprises removable lid means sized to fit said platform hole, wherein said lid means includes detector means for signalling when said lid means are over said manhole to aid in the proper initial positioning of said platform hole over said manhole, and wherein said laterally movable platform means are laterally movable to aid in the proper final positioning of said platform hole over said manhole.

17. A method of servicing a manhole comprising the steps of:
(a) providing a manhole service vehicle comprising a frame means; wheels mounted on the frame means for movement of the vehicle; top, bottom, side, front, and rear wall means which define an enclosed, sheltered, workspace within said vehicle within which a workman may work while standing at least generally upright during normal use of the vehicle for its intended purpose; a selectively openable and closeable door means for entry and exit of a workman in at least one of said side, front and rear wall means; wherein said bottom wall means defines within the vehicle a substantially flat, horizontal work floor upon which the workman can walk during normal use of the vehicle for its intended purpose; wherein said bottom wall means defines at least one hole in the work floor; wherein said hole is at least partially surrounded by said work floor and is sized to easily pass a workman therethrough; and
(b) positioning said vehicle over said manhole to be serviced with said hole in its work floor being at least substantially aligned with said manhole to enable said workman to have access to said manhole from the interior of said vehicle and to have access to the interior of said vehicle from said manhole; and
(c) servicing said manhole while said vehicle is so positioned, by the steps comprising said workman entering the manhole from said vehicle through said hole, said workman working in the manhole, and said workman entering said vehicle from said manhole through said hole, the vehicle at least partially sheltering both the manhole and the workman from the environment during the servicing process.

18. An improved manhole service vehicle of the type comprising:
a. a frame means;
b. wheels mounted on said frame means for easy movement of said vehicle; and
c. top, bottom, side, and front and rear wall means mounted on said frame means to provide an enclosed, working space within said vehicle; wherein the improvement comprises:
at least one bottom wall opening means defined by said bottom wall means, wherein said bottom wall opening means is sized to easily permit a workman to pass therethrough, wherein said vehicle is adapted to be positioned over a manhole to enable said workman to have access to said manhole from the interior of said vehicle through said bottom wall opening means while said workman and said manhole are protected from the environment by said service vehicle; wherein said service vehicle further comprises a removable safety liner means having one end adapted to extend through said bottom wall opening means, and having its other end adapted to extend into said manhole to enable said safety liner to tend to prevent substantial amounts of relative motion between said service vehicle and said manhole to prevent injury to said workman who may be located between said bottom wall opening means and said manhole, should said service vehicle be hit by another vehicle; and wherein said safety liner means further comprises step means for use of said workman in ascending or descending in said safety liner means.

19. The service vehicle according to claim 18, wherein said safety liner means further comprises utility conduit means located between said step means and said safety liner means.

20. An improved manhole service vehicle of the type comprising:
a. a frame means;
b. wheels mounted on said frame means for easy movement of said vehicle; and
c. top, bottom, side, and front and rear wall means mounted on said frame means to provide an enclosed, working space within said vehicle; wherein the improvement comprises:
at least one bottom wall opening means defined by said bottom wall means, wherein said bottom wall opening means is sized to easily permit a workman to pass therethrough, wherein said vehicle is adapted to be positioned over a manhole to enable said workman to have access to said manhole from the interior of said vehicle through said bottom wall opening means while said workman and said manhole are protected from the environment by said service vehicle; wherein said service further comprises a removable safety liner means having one end adapted to extend through said bottom wall opening means, and having its other end adapted to extend into said manhole to enable said safety liner to tend to prevent substantial amounts of relative motion between said service vehicle and said manhole to prevent injury to said workman who may be located between said bottom wall opening means and said manhole, should said service vehicle be hit by another vehicle; and wherein said frame means includes a lower permanent main frame means and a breakaway frame means which defines said bottom wall opening means, which supports said bottom wall means adjacent said bottom wall opening means, and which is secured to said lower permanent main frame means; wherein said breakaway frame means are adapted to break away when contacted by said safety liner means during a collision of said service vehicle and another vehicle, in order to permit greater relative motion between said safety liner means and said service vehicle before said safety liner means contacts a portion of said lower permanent man frame means.

21. A manhole service vehicle comprising:
a. a frame means;
b. wheels mounted on said frame means for easy movement of said vehicle;
c. top, bottom, side and front and rear wall means mounted on said frame means to provide an enclosed work space within said vehicle within which a workman may work while standing at least generally upright during normal use of the vehicle for its intended purpose;
d. a door means in at least one of said side, front and rear wall means of said vehicle, said door means being sized and located to permit the easy entry and exit of said workman into and out of said enclosed working space within said vehicle;
e. wherein said bottom wall means of said vehicle defines, within said workspace, a substantially flat, horizontal workfloor means within said vehicle upon which said workman can walk, during normal use of the vehicle for its intended purpose;
f. wherein said bottom wall means of said vehicle defines at least one bottom wall opening means, wherein said bottom wall opening means is at least partially surrounded by said workfloor means, is sized to easily permit a workman to pass therethrough, and wherein said vehicle and bottom wall opening means are adapted to be positioned over a manhole to enable said workman to have access to said manhole from the interior of said vehicle and to have access to the interior of said vehicle from said manhole through said bottom wall opening means while said workman and said manhole are protected from the environment by said service vehicle; and
g. closure means for said bottom wall opening means, wherein said closure means includes a laterally movable platform means defining a platform hole sized to easily permit said workman to pass therethrough, wherein said laterally movable platform means is adapted to move in a plane generally parallel to the surface of said bottom wall means, wherein said bottom wall opening means are sized larger than said platform hole, wherein said platfrom means are laterally movable with respect to said bottom wall opening means to permit the final alignment of said platform hole with said manhole after said vehicle has been positioned over said manhole, and wherein said platform means is sized at least generally larger than said bottom wall opening means to permit said lateral movement of said platform means with respect to said bottom wall opening means without exposing substantial amounts of said bottom wall opening means beyond the periphery of said platform means.

22. The manhole service vehicle according to claim 21, wherein said platform means overlies said bottom wall opening means.

* * * * *